United States Patent [19]
Chiba et al.

[11] Patent Number: 5,951,616
[45] Date of Patent: Sep. 14, 1999

[54] CURRENT CONTROL SYSTEM FOR LINEAR SOLENOID

[75] Inventors: Masaharu Chiba; Masao Saito; Kenji Suzuki, all of Anjo, Japan

[73] Assignee: Aisin AW Co., Ltd., Anjo, Japan

[21] Appl. No.: 08/823,199

[22] Filed: Mar. 24, 1997

[30] Foreign Application Priority Data

Apr. 15, 1996 [JP] Japan ................................. 8-092883

[51] Int. Cl.⁶ .................................................. G06F 19/00
[52] U.S. Cl. ............................. 701/58; 701/62; 701/66; 361/146; 361/152
[58] Field of Search .................................. 701/51, 58, 60, 701/62, 63, 65, 66; 477/98, 906; 361/143, 146, 159, 160, 152

[56] References Cited

U.S. PATENT DOCUMENTS 5,251,091  10/1993  Ito et al. ........................... 361/152

FOREIGN PATENT DOCUMENTS

A 7229577  8/1995  Japan .

Primary Examiner—William A. Cuchlinski, Jr.
Assistant Examiner—Ed Pipala
Attorney, Agent, or Firm—Oliff & Berridge, PLC

[57] ABSTRACT

A current control system for a linear solenoid for feedback-controlling an output voltage value on the basis of a difference between a command current value to the linear solenoid, as set according to a vehicle running state, and a feedback current value, as produced by monitoring a current value to be really fed to the linear solenoid, including: a decision circuit that decides whether or not the resistance value of the linear solenoid can be calculated; a real resistance value calculating circuit that calculates a real resistance value on the basis of a signal coming from the decision circuit, the command current value and the output voltage value; a comparison circuit that compares the calculated real resistance value and a resistance value in a memory unit; and a correction circuit that corrects the resistance value in the memory unit on the basis of the comparison result from the comparison circuit. The output voltage value is outputted on the basis of the corrected resistance value.

12 Claims, 12 Drawing Sheets

CURRENT CONTROL SYSTEM FOR LINEAR SOLENOID

BACKGROUND OF THE INVENTION

1. Field of the Invention

The present invention relates to a current control system for a linear solenoid and, more particularly, to a current control system for a linear solenoid, as used for controlling the oil pressure of an automatic transmission to be mounted on a vehicle.

2. Related Art

Generally speaking, a linear solenoid used to control oil pressure is designed to have a proportional relation, as illustrated in FIG. 13, between a current value I (mA) to be applied to the linear solenoid and an oil pressure (P). In short, the oil pressure (P) of a hydraulic circuit increases with the increase in the current value I (mA). A clutch pressure is produced by the oil pressure (P).

A command current value is set for producing the desired clutch pressure according to the running state of the vehicle. The command current value thus set is corrected to an output current in accordance with the difference from the value of the current that is actually flowing through the linear solenoid. Moreover, a voltage value is set on the basis of an output current and the resistance value of the linear solenoid, as stored in a memory unit, so that the voltage is applied to the linear solenoid by a solenoid drive circuit in response to a signal coming from a PWM output part.

The resistance value of the linear solenoid changes according to its ambient temperature. In short, the resistance value of the linear solenoid increases in proportion to the rise in the temperature of the oil in contact with the linear solenoid.

In the prior art described above, however, the output voltage value to the linear solenoid is set by a feedback control on the basis of the corrected output current and the resistance value stored in the memory unit. At a cold run, for example, the oil temperature is so low that the resistance value of the linear solenoid is actually low. However, the resistance value used when the voltage value is to be set is a fixed value retrieved from the memory unit and based on the oil pressure in a steady run. Therefore, the resistance value used is not equal to the real resistance value of the linear solenoid. As a result, the actual current flowing through the solenoid exceeds the command current. In an overheat state, on the other hand, the oil temperature rises to raise the actual resistance value so that the actual current flowing through the solenoid becomes low.

Because the feedback control is performed by monitoring the real current flow, a current value different from the desired target value, is outputted for a long time so that the clutch pressure control is influenced to cause a shift shock. Moreover, this shift shock always occurs under cold run or overheat conditions.

SUMMARY OF THE INVENTION

An object of the present invention is to solve the above-specified problems and to provide a current control system for a linear solenoid, which can control the current of a linear solenoid accurately in any temperature circumstance.

In order to achieve the above-specified object, according to the present invention, there is provided:

A current control system for a linear solenoid for feedback-controlling an output voltage value on the basis of a difference between a command current value to the linear solenoid, as set according to a vehicle running state, and a feedback current value, as produced by monitoring a current value actually being fed through the linear solenoid. The current control system includes decision means for deciding whether or not the resistance value of the linear solenoid can be calculated; real resistance value calculating means for calculating a real resistance value on the basis of a signal coming from said decision means, the command current value and the output voltage value; comparison means for comparing the calculated real resistance value and a resistance value in a memory unit; and correction means for correcting the resistance value in the memory unit on the basis of the comparison result of the comparison means, wherein the output voltage value is outputted on the basis of the corrected resistance value.

As a result, even if the resistance value of the linear solenoid is changed by the ambient temperature such as the oil temperature, the real resistance value is calculated and the output voltage value is applied to a solenoid drive circuit on the basis of the real resistance value so that the linear solenoid can always be controlled with the correct current to avoid shift shock.

Thus, it is possible to prevent the output characteristics of the linear solenoid from being changed by the temperature.

Furthermore, the present invention does not require the use of any oil temperature sensor, so an accurate resistance value can be learned while minimizing the number of parts.

In a current control system for a linear solenoid as set forth above, the decision means decides whether or not the difference between the command current value and the feedback current value is within a predetermined range. The real resistance value calculating means calculates the resistance value when the difference between the command current value and the feedback current value is within the predetermined range.

This will be described with reference to the case of a resistance value of 3 Ω of FIG. 9. When the real resistance value is to be calculated, it is determined from the command current value and the output voltage value. From a time of 0 milliseconds to a time of 300 milliseconds in FIG. 9, the command current value and the feedback current value deviate so greatly that an accurate resistance value cannot be determined. Even if, on the other hand, the real resistance value is to be calculated based on the feedback current value rather than the command current value, the feedback current may lag a change in output voltage by as much as 10 milliseconds when the feedback current is 1370 mA at a time of 100 milliseconds in FIG. 9. As a result, the voltage value at a time of 100 millisecs and the feedback current value do not correspond to each other, thereby making it difficult to calculate an accurate resistance value. By calculating the resistance value only when the difference between the command current and the feedback current is within a predetermined range, as in the present invention, a current value corresponding to the output voltage value can be achieved to calculate an accurate resistance value.

In a current control system for a linear solenoid as set forth above, the correction of the resistance value is set according to the difference between the calculated real resistance value and the resistance value in the memory unit.

By making the correction large, when the difference between the calculated resistance value and the resistance value in the memory unit is large, and small when the difference is small, the real resistance value can be quickly approached when the difference is large, and the correction of the resistance value is suppressed as much as possible when the difference is small, so that the noise resistance can be improved to control the current stably.

In a current control system for a linear solenoid as set forth above, a current is always applied within a certain period of time after an engine start, even if the linear solenoid is inoperative (so as to maintain the inoperative state.)

By applying the current at all times, therefore, the resistance value can always be learned. As a result, during a predetermined time period after the engine start, the resistance value learning is performed immediately so that accurate current control can be performed immediately after the start of the vehicle.

In a current control system for a linear solenoid as set forth above, the number of corrections per unit time is increased for a predetermined time period after the engine start.

Immediately after the engine start, the difference between the stored resistance value and the real resistance value frequently grows especially large. Therefore, the resistance value can be quickly set to the real value by increasing the number of corrections.

The current control system for a linear solenoid according to an embodiment of the present invention provides for feedback-controlling of an output voltage value on the basis of a difference between a command current value for the linear solenoid, as set according to a vehicle running state, and a feedback current value, as produced by monitoring a current value actually flowing through the linear solenoid. The current control system includes temperature detecting means for detecting the oil temperature of an automatic transmission; real resistance value setting means for setting the real resistance value of the linear solenoid on the basis of the detected oil temperature; comparison means for comparing the set real resistance value and a resistance value in a memory unit; and correction means for correcting the resistance value in the memory unit on the basis of the comparison result of the comparison means, wherein the output voltage value is outputted on the basis of the corrected resistance value.

By correcting the real resistance value recorded in memory for the linear solenoid when the resistance value is changed by the ambient temperature, such as the oil temperature, the output voltage is applied to the solenoid drive circuit on the basis of the real resistance value so that the solenoid can always be controlled with the correct command current. Thus, it is possible to prevent the output characteristics of the linear solenoid from being changed with the temperature.

According to the present invention, when the difference between a command current value ir and a feedback current value ifb is within a predetermined range, as shown in FIG. 2, a resistance value R in Ohms is calculated by the equation R=output voltage value Vr (volts)×1,000/command current value ir (in mA). This equation allows the determination of the resistance value of the linear solenoid, which is used to determine a feed forward gain KR of the feedback control.

By learning the resistance value of the linear solenoid from the output voltage value Vr and the command current value ir, the responsiveness of the linear solenoid can be equalized for any oil temperature range, thus suppressing shift shock. In short, the oil pressure responsiveness at a low oil temperature and at a high oil temperature can be improved.

By performing the resistance value learning control of the present invention, as shown in FIG. 8, the command current value can be quickly stabilized to a value (e.g., 1,200 mA) for any oil temperature range.

In the prior art, the current highly overshoots when the oil temperature is low so that the resistance value is low, as illustrated in FIG. 9. The current rises slowly when the oil temperature is high so that the resistance value is high. Therefore, the rise of the oil pressure is changed by the oil temperature, and shift shock is produced.

In an embodiment of the present invention, whether or not the resistance value of the linear solenoid can be calculated can be decided depending upon whether or not the difference between the modulator current command value and the monitor current value is within the predetermined range. The decision on whether or not the resistance value of the linear solenoid can be calculated may also be made on the basis of the change in the output voltage value or on the basis of elapsed time.

Moreover, the oil temperature indicating the ambient temperature of the linear solenoid may be detected to learn the resistance value on the basis of the oil temperature.

The resistance value of the linear solenoid may also be determined on the basis of the engine water temperature in place of the oil temperature sensor, however the accuracy drops.

DESCRIPTION OF PREFERRED EMBODIMENTS

Figure 1:
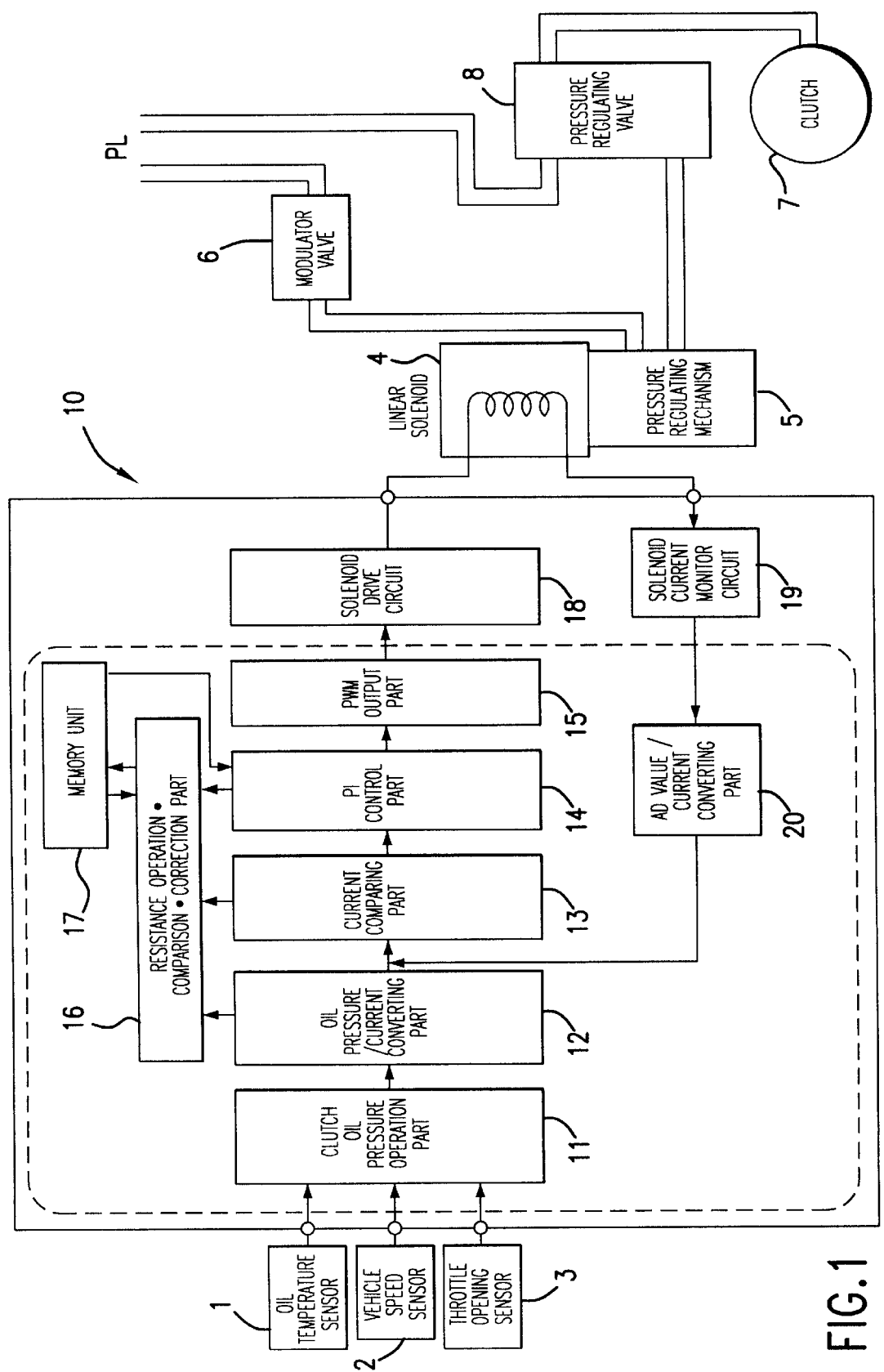
FIG. 1 is a diagram showing the entire construction of a current control system for a linear solenoid according to an embodiment of the present invention.
Figure 2:
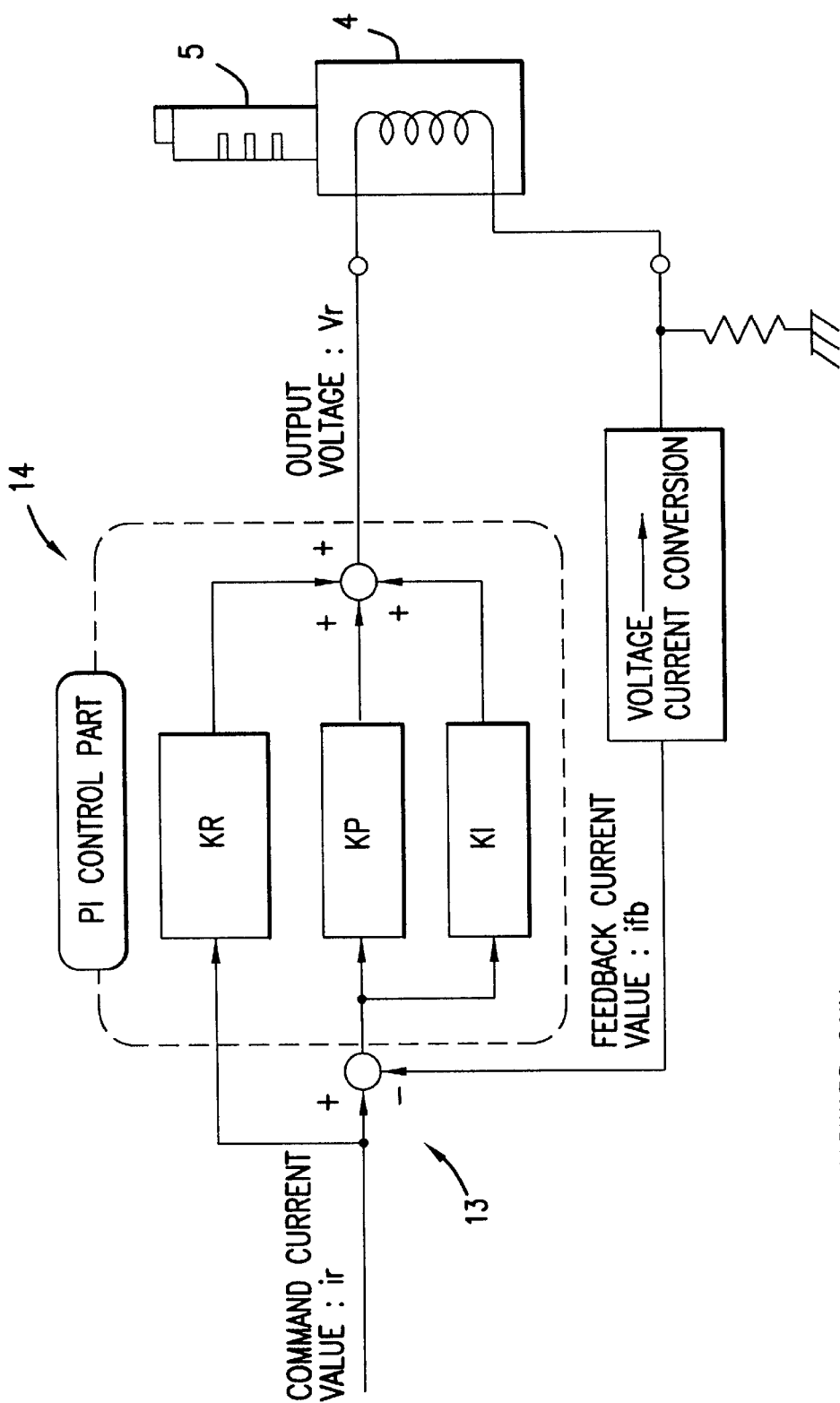
FIG. 2 is a diagram showing a current control system of the linear solenoid according to an embodiment of the present invention.

FIG. 1 is a diagram showing the entire construction of a current control system for a linear solenoid according to an embodiment of the present invention, and FIG. 2 is a diagram showing a current control system of the linear solenoid.

In FIG. 1: reference numeral 1 designates an oil temperature sensor; numeral 2 a vehicle speed sensor; numeral 3 a throttle opening sensor; numeral 4 a linear solenoid; numeral 5 a pressure regulating mechanism; numeral 6 a modulator valve arranged in the line pressure (PL) system; numeral 7 a clutch; and numeral 8 a pressure regulating valve for regulating the oil pressure to be fed to the clutch.

Numeral 10 designates an electronic control unit which is composed of: a clutch oil pressure operation part 11 connected with the oil temperature sensor 1, the vehicle speed sensor 2 and the throttle opening sensor 3, individually; an oil pressure/current converting part 12 connected with the clutch oil pressure operation part 11; a current comparing part 13 connected with the oil pressure/current converting part 12; a PI (proportional and integral) control part 14 connected with the current comparing part 13; a PWM output part 15 (pulse width modulator) connected with the PI control part 14; and a solenoid drive circuit 18 connected with the PWM output part 15 to feed its output to the linear solenoid 4. With this linear solenoid 4, there is connected a solenoid current monitor circuit 19, with which is connected an AD (analog-to-digital) value/current converting part 20 to feed back its output to the current comparing part 13.

This feedback control system has a construction, as shown in FIG. 2. Specifically, the PI control part 14 has a feed forward gain KR, a proportional gain KP and an integral gain KI so that an output voltage Vr, as based on the output coming from the PI control part 14, is applied to the linear solenoid 4. The solenoid current of the linear solenoid 4 is monitored and subjected to a voltage/current conversion so that a feedback current value ifb is compared in the current comparing part 13 with a command current value ir until it is fed back.

In the present invention, moreover, the outputs of the oil pressure/current converting part 12, the current comparing part 13 and the PI control part 14 are connected with a resistance operation·comparison·correction part 16 capable of transferring data with a memory unit 17, the data of which can be read out to the PI control part 14.

Specifically, when the difference between the command current value ir and the feedback current value ifb is within a predetermined range, the resistance value R is calculated by R=the output voltage value Vr×1,000/the command current value ir to determine the resistance value of the linear solenoid 4 thereby to set it as the feed forward gain KR of the feedback control.

Here, the output voltage value Vr=(ir×KR)+(ie×KP)+KI∫ie·dt.

In the present invention, as described above, by learning the resistance of the linear solenoid from the output voltage and the command current value, the feed forward gain KR can be properly changed to equalize the responsiveness of the linear solenoid for any oil temperature range, thereby suppressing the dispersion of a shift shock.

Specifically, the oil pressure responsiveness at a cold oil temperature or at a high oil temperature can be improved to reduce the dispersion of the shift shock.

In short, a tuning of higher accuracy can be effected to damp the shift shock.

Here will be specifically described the current control of the linear solenoid of the present invention.

Figure 3:
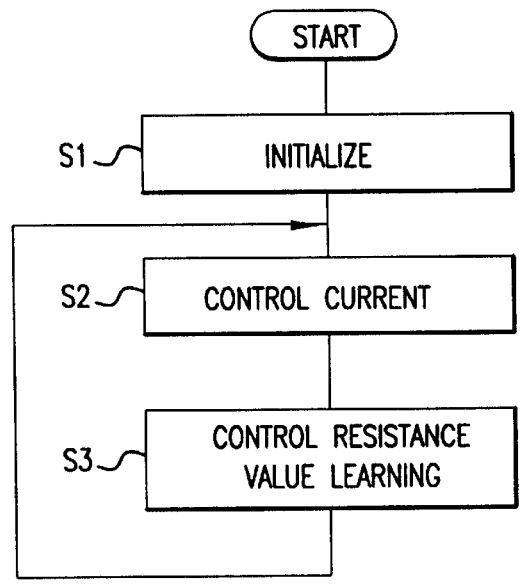
FIG. 3 is a main flow chart of the current control of the linear solenoid of the present invention.

FIG. 3 is a main flow chart of the current control of the linear solenoid of the present invention.

(1) First of all, the current control system of the linear solenoid is initialized (at Step S1).

(2) Next, the current of the linear solenoid is controlled (as shown in a later-described current control flow chart of FIG. 5) (at Step S2).

(3) Next, the resistance value learning of the linear solenoid is controlled (as shown in a later-described resistance value learning control flow chart of FIG. 6) (at Step S3).

Figure 4:
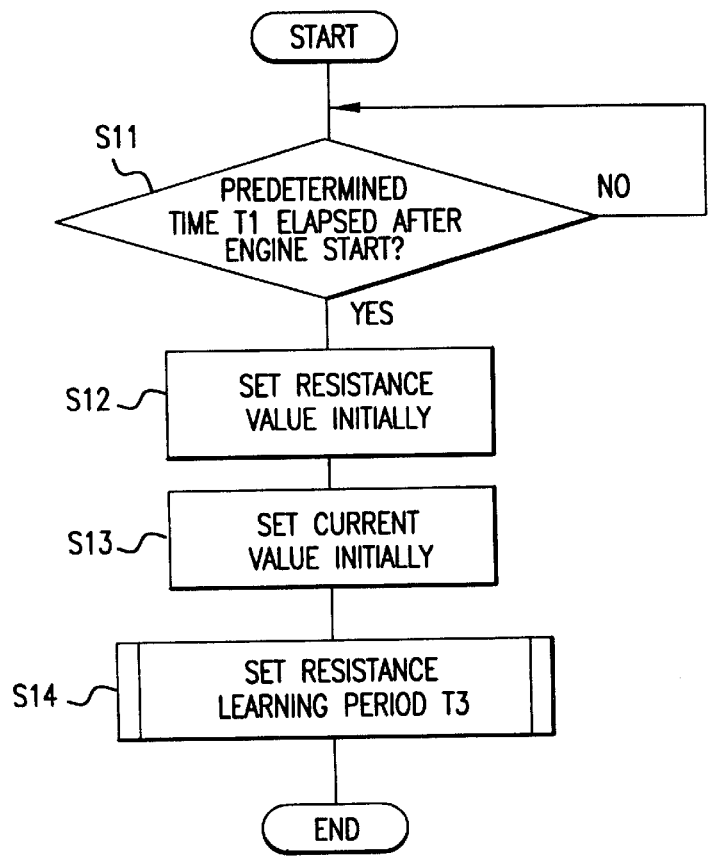
FIG. 4 is a flow chart of the initialization of the current control of the linear solenoid of the present invention.

The initialization is performed as follows:

FIG. 4 is a flow chart of the initialization of the current control of the linear solenoid of the present invention.

(1) First of all, it is checked (at Step S11) whether or not a predetermined time T1 has elapsed after an engine start. A lapse time is taken because it is usual for the power supply to be unstable for about 100 milliseconds after the engine start.

(2) After the predetermined time T1 has elapsed, the resistance of the linear solenoid is then set (at Step S12) to its initial value.

(3) Next, the current value of the linear solenoid is set (at Step S13) to its initial value.

(4) Next, a resistance learning period T3 of the linear solenoid is set (at Step S14).

Figure 5:
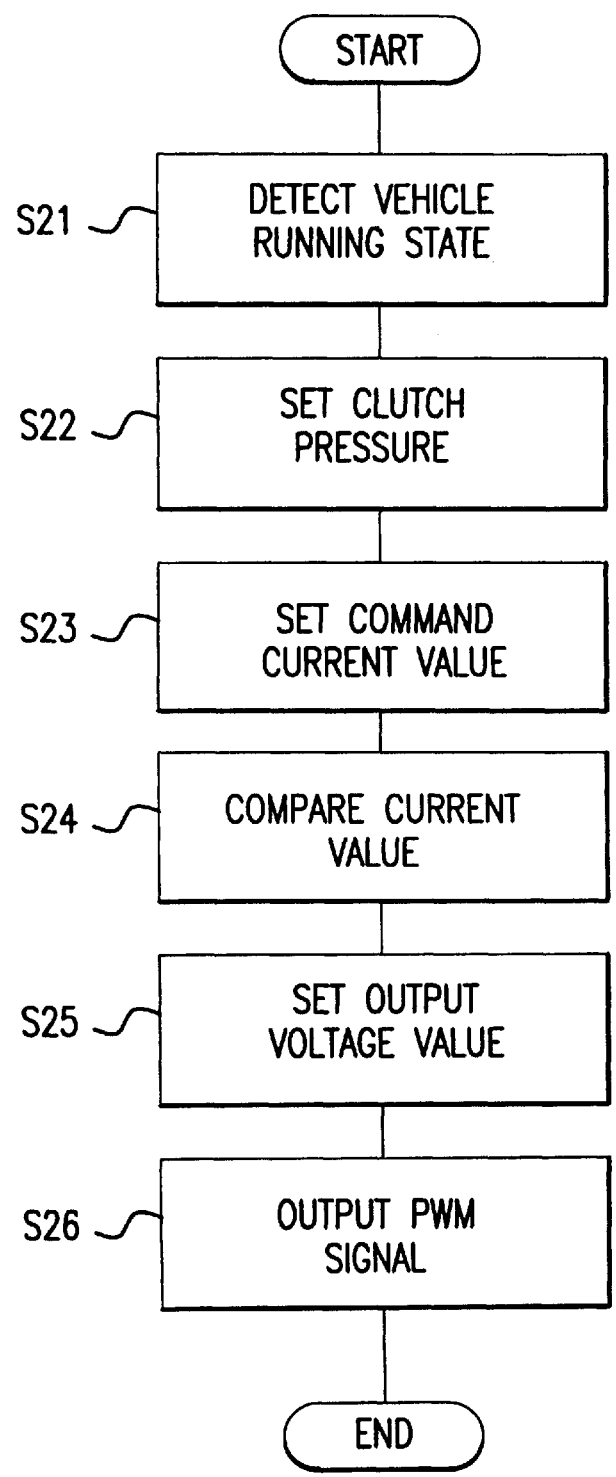
FIG. 5 is a flow chart of the current control of the linear solenoid of the present invention.

FIG. 5 is a flow chart of the current control of the linear solenoid of the present invention as referred to in step S2 of FIG. 3.

(1) At first, the vehicle running state is detected (at Step S21) on the basis of the data coming from the vehicle speed sensor 2, the throttle opening sensor 3 and the oil temperature sensor.

(2) Next, the clutch pressure is set (at Step S22).

(3) Next, the command current value ir is set (at Step S23).

(4) Next, the actual current value is compared with the command current (at Step S24) at the current comparing part 13.

(5) Next, the output voltage value is set (at Step S25) at the PI control part 14. In short, the voltage value Vr to be outputted is set according to the difference between the command current value ir and the feedback current value ifb.

(6) Next, the PWM signal is outputted (at Step S26) from the PWM output part 15 to the linear solenoid.

Here will be described the aforementioned resistance value learning control.

Figure 6:
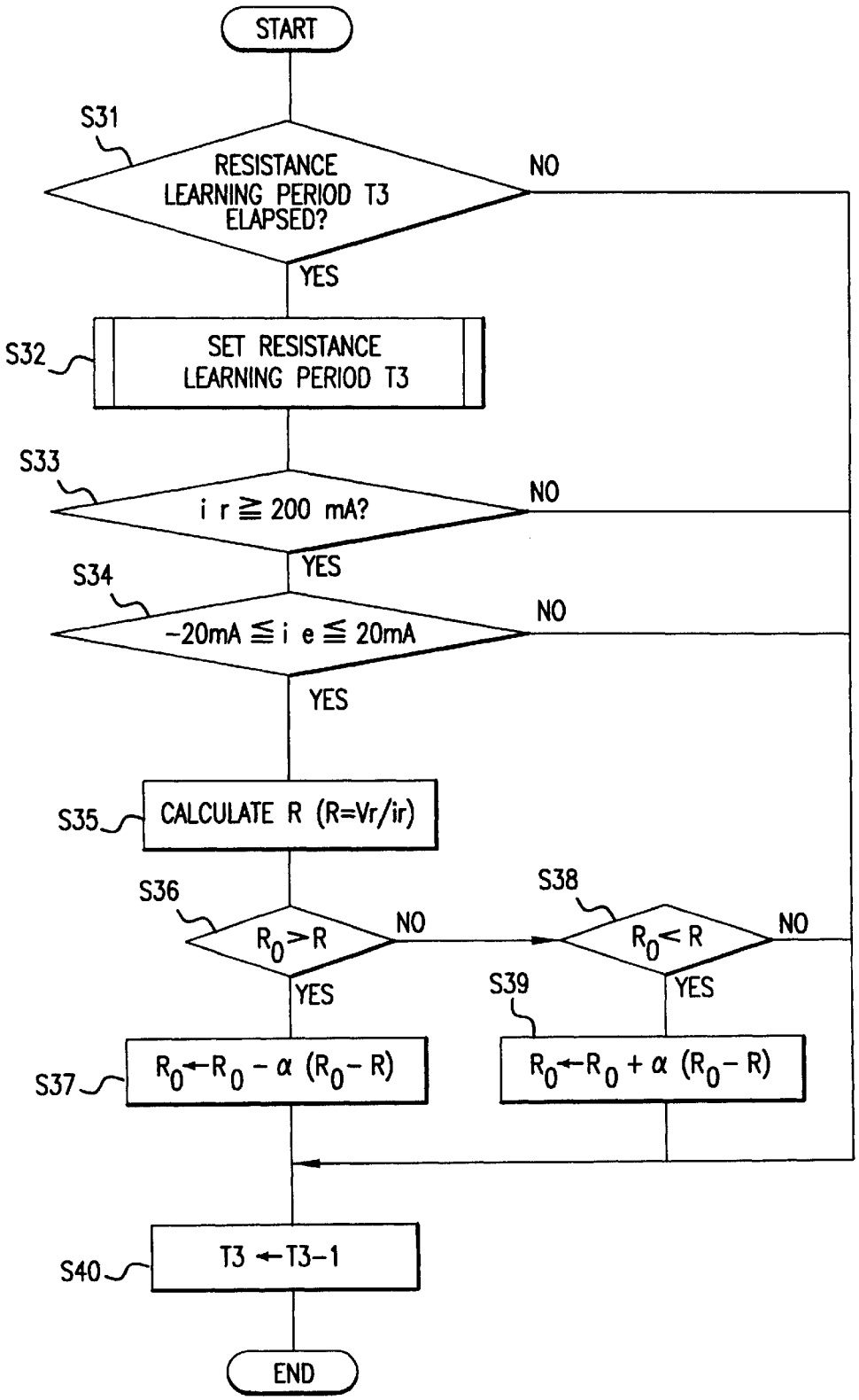
FIG. 6 is a flow chart showing the resistance value learning control in conjunction with the current comparison of the present invention.

The resistance value learning control of step S3 in FIG. 3 is shown in detail in FIG. 6.

FIG. 6 is a flow chart showing the resistance value learning control by the current comparison of the present invention.

(1) At first, it is checked (at Step S31) whether or not the resistance learning period T3 has elapsed.

(2) Next, if the predetermined time T3 elapses, the resistance learning period T3 is set (at Step S32).

(3) Next, it is checked (at Step S33) whether or not the command current value ir is greater than or equal to 200 mA.

(4) Next, if the answer of the aforementioned Step S33 is YES, it is checked (at Step S34) whether or not the difference ie between the command current value ir and the feedback current value ifb is within a predetermined range, i.e., more than −20 mA and less than 20 mA.

(5) Next, if the answer of the aforementioned Step S34 is YES, the resistance value R of the linear solenoid is calculated according to the equation: output voltage value Vr/command current value ir (Step S35).

(6) Next, it is checked (at Step S36) whether or not the resistance value R calculated is below a resistance value $R_0$, as stored in the memory unit 17.

(7) Next, if the answer of the aforementioned Step S36 is YES, the stored resistance value is adjusted (at Step S37) by the difference between the calculated resistance value R and the stored resistance value $R_0$ in a series of steps. In short, $R_0 \leftarrow R_0 - \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(8) If the answer of the aforementioned Step S36 is NO, it is checked (at Step S38) whether or not the calculated resistance value R is over the resistance value $R_0$, as stored in the memory unit 17.

(9) If the answer of the aforementioned Step S38 is YES, the stored resistance value is adjusted (at Step S39) by the difference between the calculated resistance value R and the stored resistance value $R_0$. In short, $R_0 \leftarrow R_0 + \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(10) Next, the learning period T3 is reduced (at Step S40). If the individual answers of the aforementioned Steps S31, S33, S34 and S38 are NO, the routine advances to the aforementioned Step S40.

Figure 7:
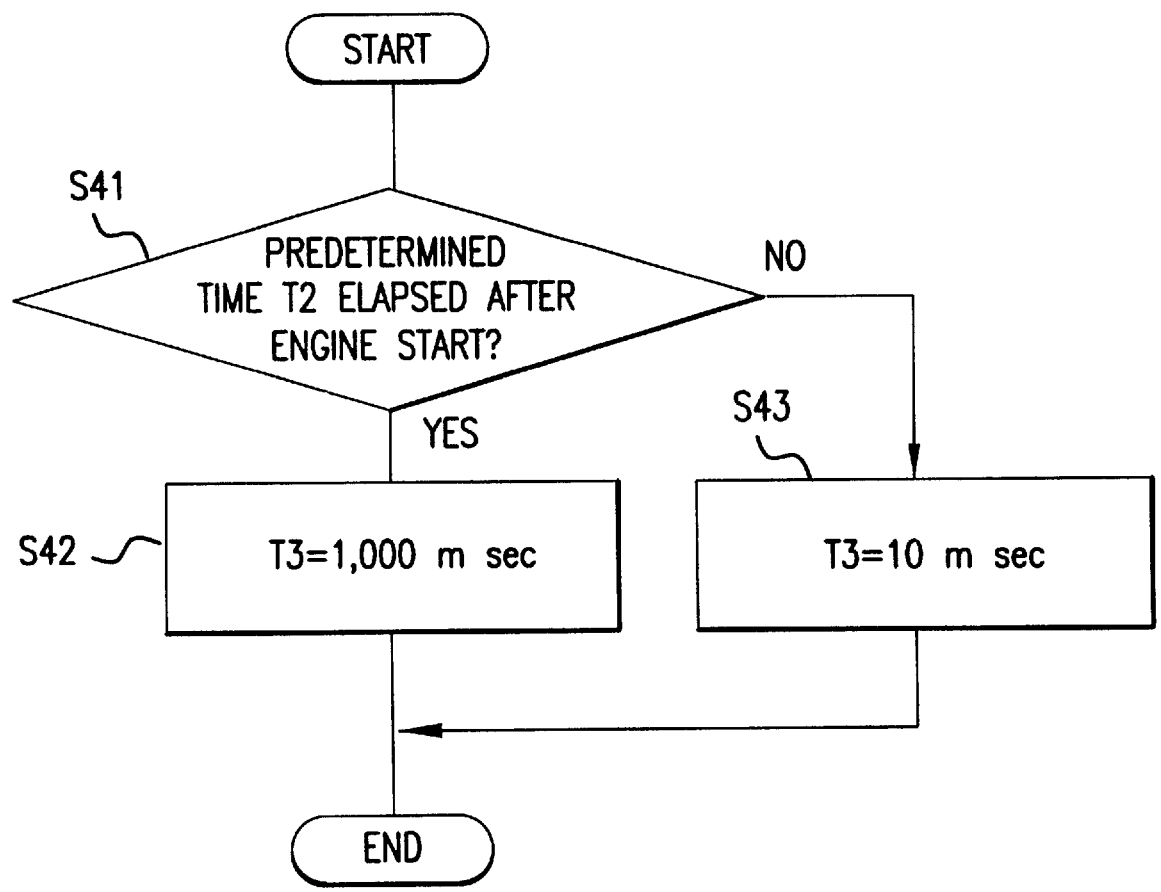
FIG. 7 is a flow chart for setting the resistance learning period T3 of the linear solenoid of the present invention.

FIG. 7 is a flow chart for setting the resistance learning period T3 of the linear solenoid of the present invention. The learning period is the length of time elapsed during correction of the resistance value.

(1) At first, it is checked (at Step S41) whether or not a predetermined time T2 (e.g., 30 sec) has elapsed after an engine start.

(2) If the answer of the aforementioned Step S41 is YES, the learning period T3 is set (at Step S42) to 1,000 milliseconds.

(3) If the answer of the aforementioned Step S41 is NO, the learning period is set (at Step S43) to 10 milliseconds.

Specifically in the state just after the engine start, it is usual that the oil temperature is frequently low so that the difference between the real resistance value and the resistance value in the memory unit is frequently large. If 30 sec has not elapsed, for example, after the engine start, the learning period is shortened so that the resistance in the memory unit may be able to approach the real resistance value quickly. If 30 sec elapses, on the other hand, the real resistance value and the resistance value in the memory unit become substantially equal, and the oil temperature is not abruptly changed to stabilize the resistance value. Considering the necessity for the learning and the stability of the current control, therefore, the learning period is elongated.

Figure 8:
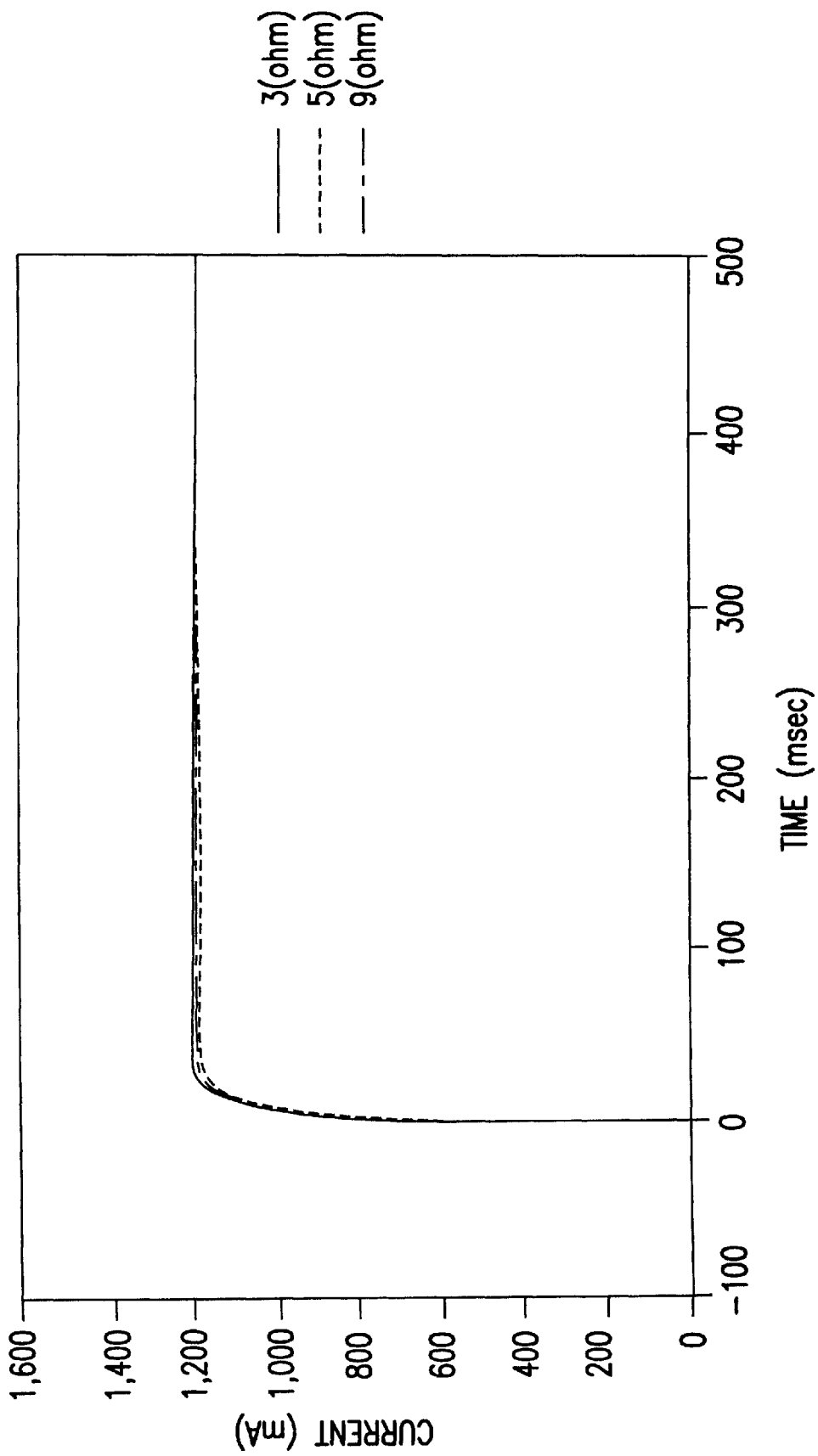
FIG. 8 is a current feedback waveform diagram of the case of the resistance learning of the present invention.
Figure 9:
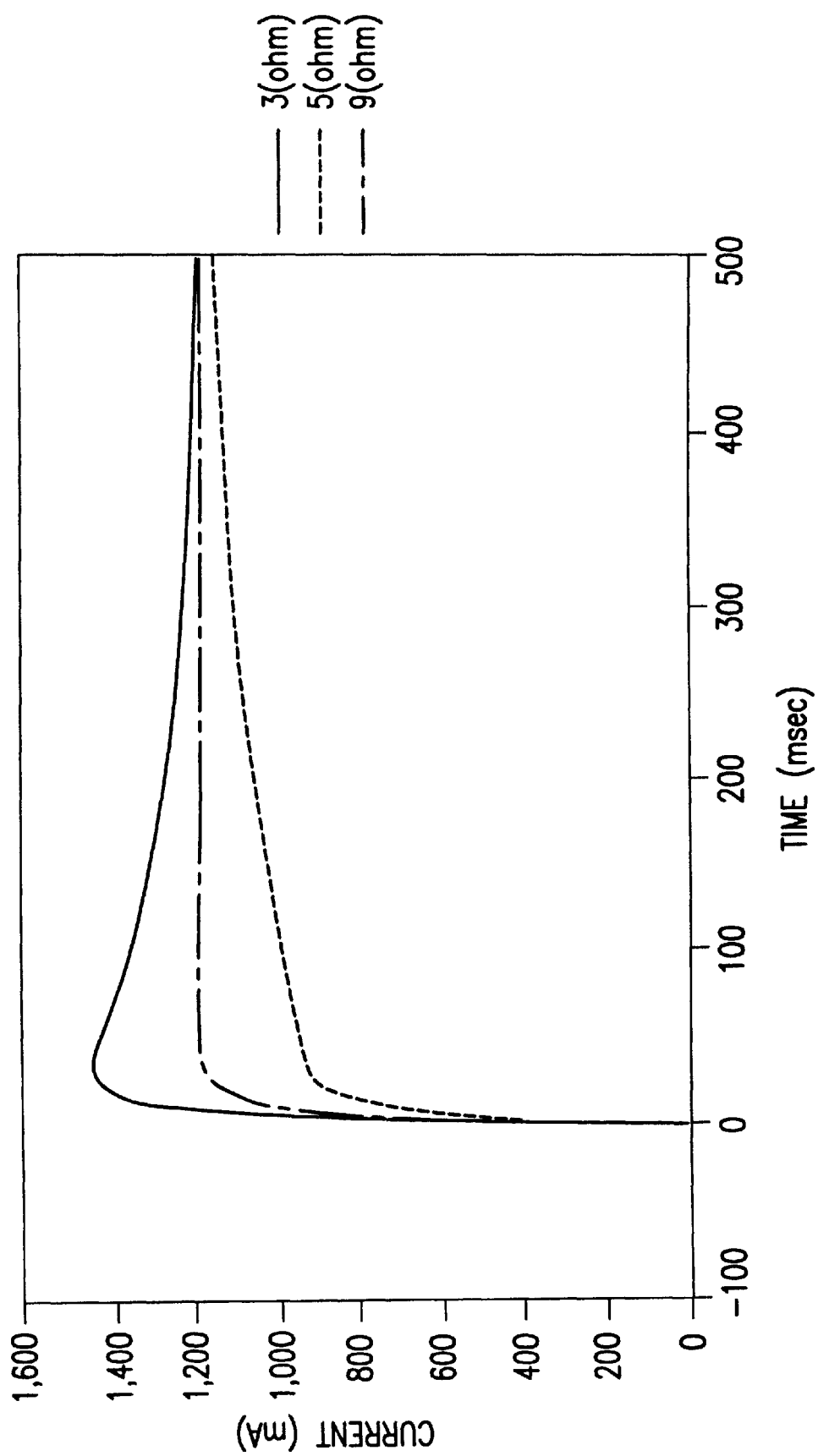
FIG. 9 is a current feedback waveform diagram of the case of no resistance learning of the prior art.

FIG. 8 is a current feedback waveform diagram of the case of the resistance learning of the present invention, and FIG. 9 is a current feedback waveform diagram of the case of no resistance learning of the prior art. Both of these Figures present waveforms of the case in which 1,200 mA is continuously outputted as the command current value.

It is apparent from FIG. 8 that the command current value can be quickly stabilized (to 1,200 mA, for example) for any oil temperature range by performing the resistance value learning control in conjunction with the current value comparison.

Without the resistance learning process of the present invention, prior art systems produce a control current that takes a stable normal value, as illustrated in FIG. 9, when the linear solenoid has a resistance value of 5 Ω (at an ordinary temperature of 80° C.). However, the control current highly overshoots the command current value of 1,200 mA when the linear solenoid has a resistance value of 3 Ω (at a cold run). When the linear solenoid has a resistance of 9 Ω (at an overheat time), on the other hand, the control current falls short of the command current value of 1,200 mA.

Figure 10:
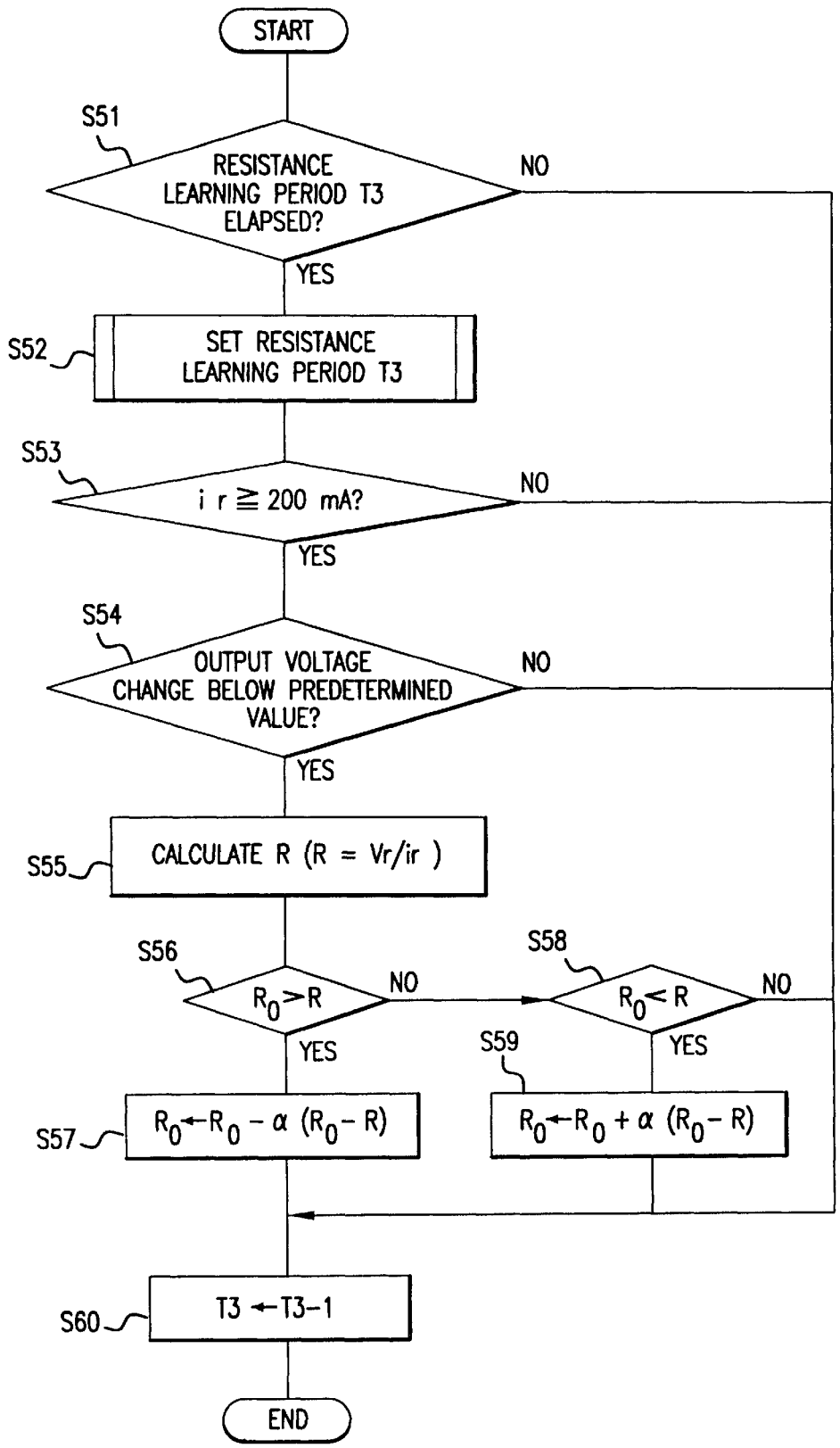
FIG. 10 is a flow chart showing the resistance value learning control by the voltage value change of the present invention.

The resistance value learning control by the voltage value change is illustrated in FIG. 10.

(1) At first, it is checked (at Step S51) whether or not the resistance value learning period T3 of the linear solenoid has elapsed, that is, whether or not T3=0.

(2) Next, if the predetermined time T3 has elapsed, the resistance value learning period T3 of the linear solenoid is set (at Step S52).

(3) Next, it is checked (at Step S53) whether or not the command current value ir is greater than or equal to 200 mA.

(4) Next, if the answer of the aforementioned Step S53 is YES, it is checked (at Step S54) whether or not the output voltage value change is below a predetermined value for the preceding output voltage value.

(5) Next, if the answer of the aforementioned Step S54 is YES, the resistance value R of the linear solenoid is calculated according to the equation: output voltage value Vr/command current value ir (at Step S55).

(6) Next, it is checked (at Step S56) whether or not the calculated resistance value R is below the resistance value $R_0$, as stored in the memory unit 17.

(7) Next, if the answer of the aforementioned Step S56 is YES, the learning is controlled (at Step S57) the difference between the calculated resistance value R and the stored resistance value $R_0$. In short, $R_0 \leftarrow R_0 - \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(8) If the answer of the aforementioned Step SS6 is NO, it is checked (at Step S58) whether or not the calculated resistance value R is over the resistance value $R_0$, as stored in the memory unit 17.

(9) If the answer of the aforementioned Step S58 is YES, the learning is controlled (at Step S59) the difference between the calculated resistance value R and the stored resistance value $R_0$. In short, $R_0 \leftarrow R_0 + \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(10) Next, the learning period T3 is reduced (at Step S60). If the individual answers of the aforementioned Steps S51, S53, S54 and S58 are NO, the routine advances to the aforementioned Step S60.

Figure 11:
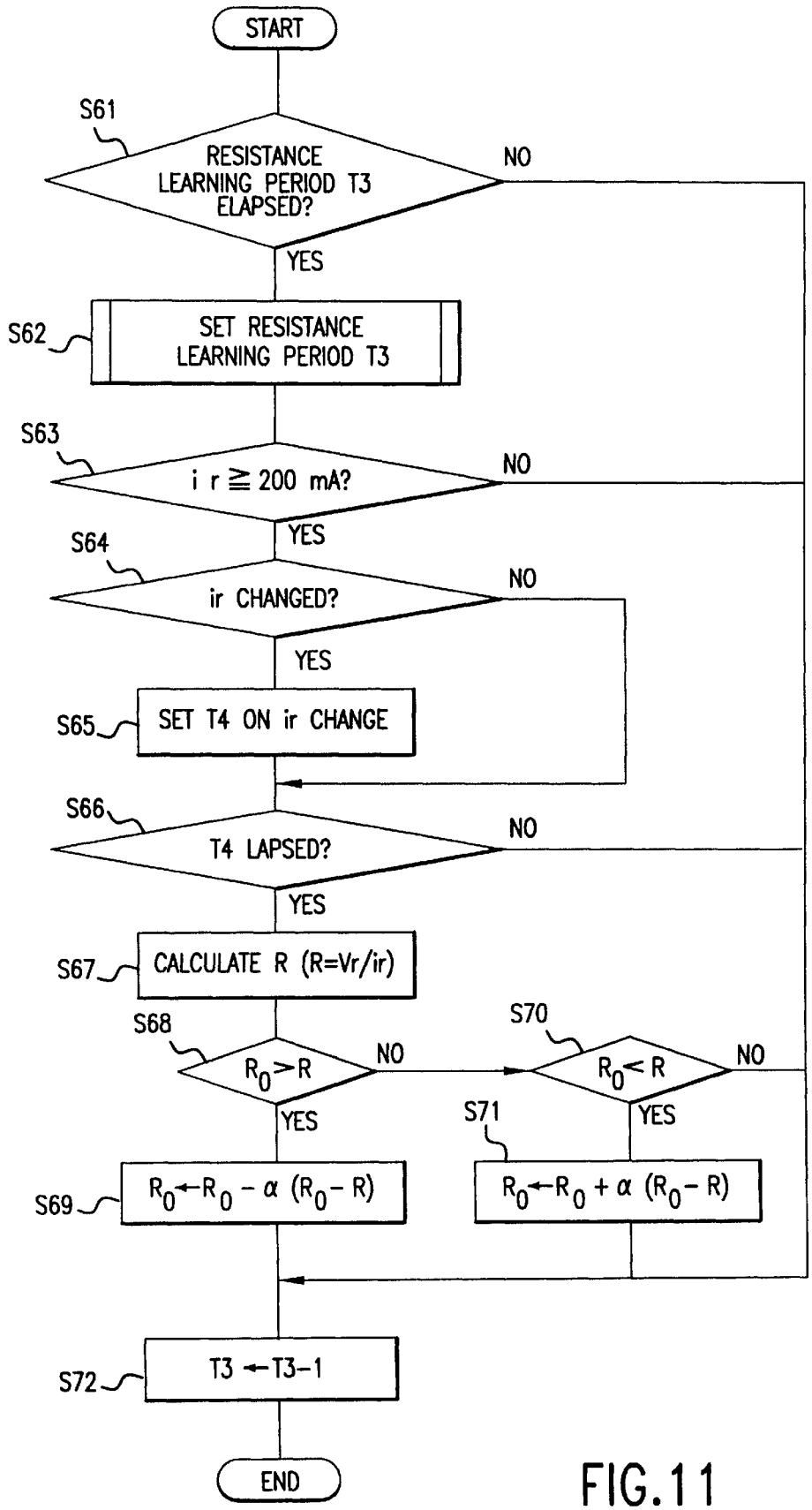
FIG. 11 is a flow chart showing the resistance value learning control by the timer of the present invention.

The resistance value learning control by a timer is illustrated in FIG. 11.

(1) At first, it is checked (at Step S61) whether or not the resistance value learning period T3 of the linear solenoid has elapsed, that is, whether or not T3=0.

(2) Next, if the predetermined time T3 has elapsed, the resistance value learning period T3 of the linear solenoid is set (at Step S62).

(3) Next, it is checked (at Step S63) whether or not the command current value ir is greater than or equal to 200 mA.

(4) Next, if the answer of the aforementioned Step S63 is YES, it is checked (at Step S64) whether or not the command current value ir changes.

(5) Next, a time T4 is set (at Step S65) by the timer on the basis of the change in the command current value ir.

(6) Next, it is checked (at Step S66) whether or not the set time T4 has elapsed.

(7) If the answer of the aforementioned Step S66 is YES, the resistance value R of the linear solenoid is calculated according to the equation: output voltage value Vr/command current value ir (at Step S67).

(8) Next, it is checked (at Step S68) whether or not the calculated resistance value R is below the resistance value $R_0$, as stored in the memory unit 17.

(9) Next, if the answer of the aforementioned Step S68 is YES, the learning is controlled (at Step S69) the difference between the calculated resistance value R and the stored resistance value $R_0$. In short, $R_0 \leftarrow R_0 - \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(10) If the answer of the aforementioned Step S68 is NO, it is checked (at Step S70) whether or not the calculated resistance value R is greater than the resistance value $R_0$, as stored in the memory unit 17.

(11) If the answer of the aforementioned Step S70 is YES, the learning is controlled (at Step S71) the difference between the calculated resistance value R and the stored resistance value $R_0$. In short, $R_0 \leftarrow R_0 + \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(12) Next, the learning period T3 is reduced (at Step S72). Incidentally, if the individual answers of the aforementioned Steps S61, S63, S66 and S70 are NO, the routine advances to the aforementioned Step S72.

Figure 12:
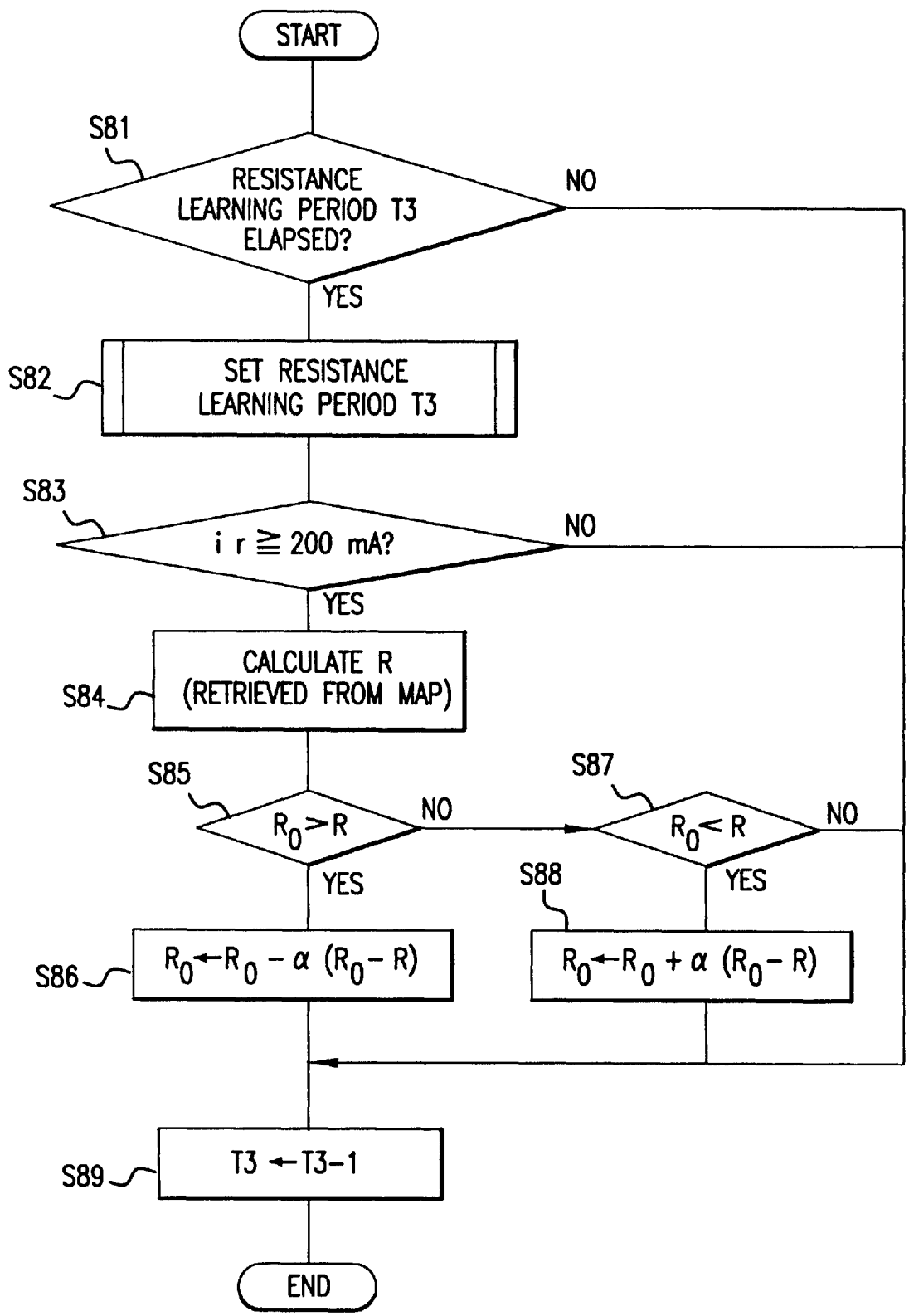
FIG. 12 is a flow chart showing the resistance value learning control by the oil temperature detection of the present invention.
Figure 13:
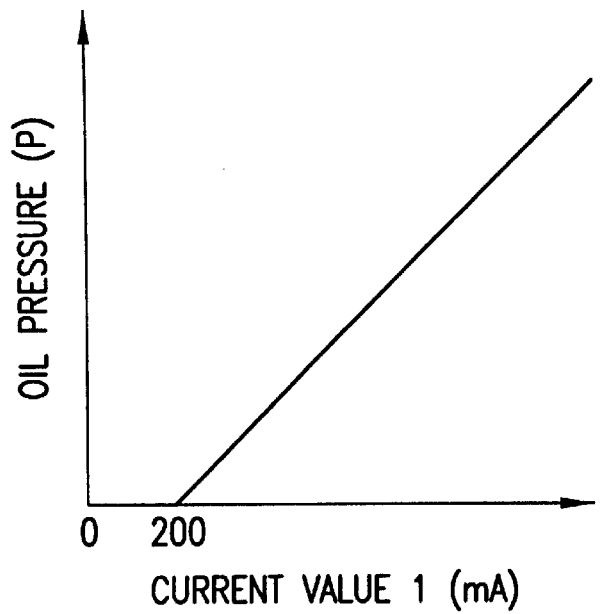
FIG. 13 is a diagram illustrating a relation between a current value to be fed to the linear solenoid and an oil pressure to be produced thereby.
Figure 14:
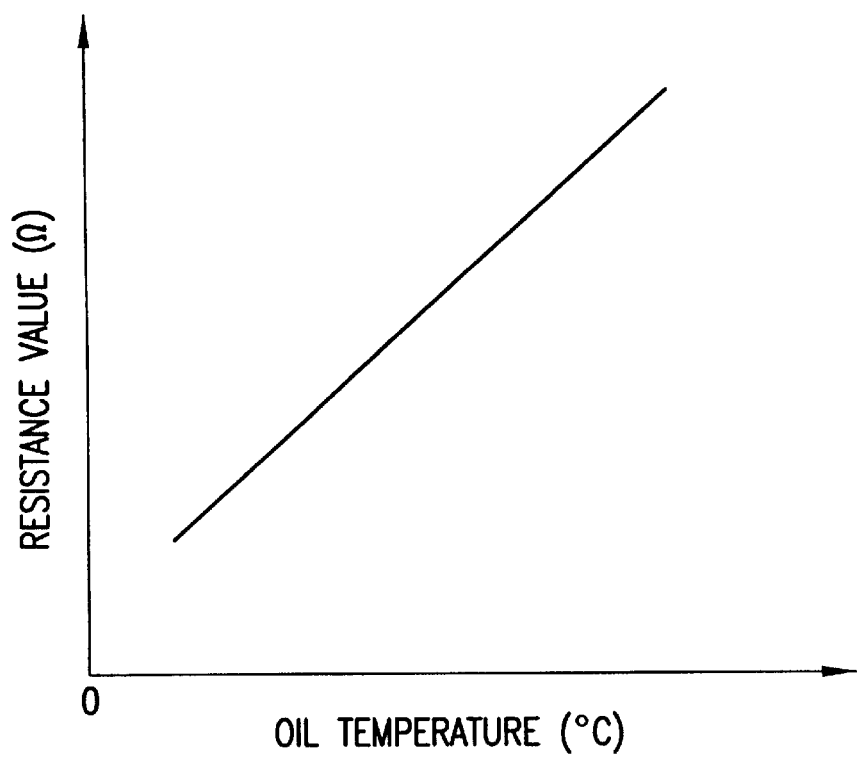
FIG. 14 is a diagram illustrating a relation between the oil temperature and the resistance value of the linear solenoid.

The resistance value learning control by an oil temperature detection is illustrated in FIG. 12.

(1) At first, it is checked (at Step S81) whether or not the resistance value learning period T3 has elapsed, that is, whether or not T3=0.

(2) Next, if the predetermined time T3 has elapsed, the resistance value learning period T3 is set (at Step S82).

(3) Next, it is checked (at Step S83) whether or not the command current value ir is greater than or equal to 200 mA.

(4) Next, if the answer of the aforementioned Step S83 is YES, the oil temperature and the resistance value of the linear solenoid are mapped in advance and stored in the memory unit 17 so that the resistance value R is determined (at Step S84) by retrieving the map.

(5) Next, it is checked (at Step S85) whether or not the resistance value R is less than the resistance value $R_0$, as stored in the memory unit 17.

(6) Next, if the answer of the aforementioned Step S85 is YES, the learning is controlled (at Step S86) the difference between the calculated resistance value R and the stored resistance value $R_0$. In short, $R_0 \leftarrow R_0 - \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(7) If the answer of the aforementioned Step S85 is NO, it is checked (at Step S87) whether or not the calculated resistance value R is greater than the resistance value $R_0$, as stored in the memory unit 17.

(8) If the answer of the aforementioned Step S87 is YES, the learning is controlled (at Step S88) the difference between the calculated resistance value R and the stored resistance value $R_0$. In short, $R_0 \leftarrow R_0 + \alpha(R_0 - R)$. Here, the letter $\alpha$ indicates a coefficient, e.g., ¼. Coefficient $\alpha$ is varied in order to make the correction large, when the difference between the calculated resistance value and the resistance value in the memory unit is large, and small when the difference is small. Therefore, the real resistance value can be quickly approached when the difference is large, and approached more gradually when the difference is small. When the difference is small, the correction of the resistance value is suppressed as much as possible to gradually reduce the difference so as to prevent disturbances from abrupt corrections of the resistance value, thus allowing stabilization of current output.

(9) Next, the learning period T3 is reduced (at Step S89).

If the individual answers of the aforementioned Steps S81, S83 and S87 are NO, the routine advances to the aforementioned Step S89.

Depending upon whether or not the difference between the modulator current command value and the monitor current value is within the predetermined range, as described above, it is possible to decide whether or not the resistance value of the linear solenoid can be calculated. However, this decision may also be made by another method using the change in the output voltage value or the timer.

Moreover, the oil temperature indicating the ambient temperature of the linear solenoid may be detected to learn the resistance value on the basis of the oil temperature.

In place of the oil temperature sensor, moreover, the resistance value may be learned on the basis of the engine water temperature although the accuracy is degraded.

The foregoing description of preferred embodiments of the invention has been presented for purposes of illustration and description. It is not intended to be exhaustive or to limit the invention to the precise form disclosed. Obvious modifications or variations are possible in light of the above teachings.

What is claimed is:

1. A current control system for a linear solenoid for feedback-controlling an output voltage value on the basis of a difference between a command current value to the linear solenoid, as set according to a vehicle running state, and a feedback current value, as produced by monitoring a current value actually passing through the linear solenoid, comprising:

decision means for deciding whether or not the resistance value of the linear solenoid can be calculated;

real resistance value calculating means for calculating a real resistance value of said linear solenoid on the basis of a signal coming from said decision means, said command current value and said output voltage value;

comparison means for comparing the calculated real resistance value and a resistance value in a memory unit; and correction means for correcting the resistance value in said memory unit on the basis of the comparison result of said comparison means, wherein said output voltage value is outputted on the basis of the corrected resistance value.

2. A current control system for a linear solenoid according to claim 1, wherein said decision means decides whether or not the difference between said command current value and said feedback current value is within a predetermined range, and wherein said real resistance value calculating means calculates the resistance value when the difference between said command current value and said feedback current value is within the predetermined range.

3. A current control system for a linear solenoid according to claim 2, wherein the correction of said resistance value is set according to the difference between the calculated real resistance value and the resistance value in said memory unit.

4. A current control system for a linear solenoid according to claim 1, wherein a current is provided to said linear solenoid immediately after an engine start, even if the linear solenoid is inoperative, in order to maintain the inoperative state of the linear solenoid.

5. A current control system for a linear solenoid according to claim 2, wherein a current is provided to said linear solenoid immediately after an engine start, even if the linear solenoid is inoperative, in order to maintain the inoperative state of the linear solenoid.

6. A current control system for a linear solenoid according to claim 3, wherein a current is provided to said linear solenoid immediately after an engine start, even if the linear solenoid is inoperative, in order to maintain the inoperative state of the linear solenoid.

7. A current control system for a linear solenoid according to claim 4, wherein said correction means corrects the resistance value by an increased number of corrections per unit time for a predetermined time period after the engine start.

8. A current control system for a linear solenoid for feedback-controlling an output voltage value on the basis of a difference between a command current value to the linear solenoid, as set according to a vehicle running state, and a feedback current value, as produced by monitoring a current value actually passing through the linear solenoid, comprising:

temperature detecting means for detecting an oil temperature of an automatic transmission;

real resistance value setting means for setting a real resistance value of the linear solenoid on the basis of the detected oil temperature;

comparison means for comparing the set real resistance value and a resistance value in a memory unit; and correction means for correcting the resistance value in said memory unit on the basis of the comparison result of said comparison means, wherein said output voltage value is outputted on the basis of the corrected resistance value.

9. A current control system for a linear solenoid, comprising:

a solenoid current monitoring circuit;

a command current setting circuit that receives input from a vehicle running state sensor and that outputs a command current value;

a resistance calculating circuit that inputs said command current value and that inputs an output voltage value, with said resistance calculating circuit outputting a corrected real resistance value;

a comparison circuit that inputs said corrected real resistance value an d a stored resistance value, and that outputs a difference in resistance between said corrected real resistance value and said stored resistance value; and a correction circuit that adjusts said stored resistance value based on said difference in resistance and that outputs a corrected output voltage value calculated using said adjusted resistance value to said resistance calculating circuit.

10. The current control system according to claim 9, wherein:

said solenoid current monitoring circuit outputs a feedback current value, and said current control system further including a current comparison circuit with said current comparison circuit inputting said feedback current value and said command current value, and outputting a difference in current to said correction circuit, and said correction circuit only adjusting said stored resistance value and outputting a corrected output voltage value when said difference in current is less than or equal to a predetermined value.

11. A method of feedback controlling an output voltage provided to a linear solenoid, said method including the steps of:

determining a command current value that must be supplied to the linear solenoid in order to produce a desired transmission oil pressure based on a vehicle running state;

calculating a real resistance value of the linear solenoid based on said command current value and an output voltage value;

comparing said real resistance value with a resistance value of the linear solenoid that is stored in memory;

correcting the stored resistance value based upon comparison results from said comparing step; and determining an updated output voltage value for use in said calculating step based upon a corrected resistance value produced in said correcting step.

12. The method according to claim 11, further including the steps of:

determining a feedback current value from current actually flowing through the linear solenoid;

comparing said feedback current value with said command current value and determining a difference in current between said feedback current value and said command current value, and delaying the correcting step until said difference in current is less than or equal to a predetermined value.

* * * * *